(12) United States Patent
Kim (10) Patent No.: US 9,731,678 B2
(45) Date of Patent: Aug. 15, 2017

(54) PASSENGER AIR BAG APPARATUS FOR VEHICLE

(71) Applicant: Hyundai Motor Company, Seoul (KR)

(72) Inventor: Eung Man Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/040,315

(22) Filed: Feb. 10, 2016

(65) Prior Publication Data

US 2017/0129445 A1    May 11, 2017

(30) Foreign Application Priority Data

Nov. 6, 2015  (KR) .................. 10-2015-0155876

(51) Int. Cl.
*B60R 21/239* (2006.01)
*B60R 21/2338* (2011.01)
*B60R 21/231* (2011.01)

(52) U.S. Cl.
CPC .......... *B60R 21/239* (2013.01); *B60R 21/231* (2013.01); *B60R 2021/2395* (2013.01); *B60R 2021/23382* (2013.01)

(58) Field of Classification Search
CPC .......... B60R 21/239; B60R 2021/2395; B60R 2021/23382
See application file for complete search history.

(56) References Cited

U.S. PATENT DOCUMENTS

| 6,736,426 | B2* | 5/2004 | Winters | B60R 21/233 280/743.2 |
|---|---|---|---|---|
| 9,216,712 | B1* | 12/2015 | Kwon | B60R 21/2338 |
| 9,376,081 | B2* | 6/2016 | Choi | B60R 21/216 |
| 9,393,927 | B2* | 7/2016 | Kim | B60R 21/239 |
| 2006/0151979 | A1* | 7/2006 | DePottey | B60R 21/2338 280/739 |
| 2010/0032931 | A1* | 2/2010 | Kumagai | B60R 21/2338 280/742 |
| 2010/0102542 | A1* | 4/2010 | Nakajima | B60R 21/233 280/743.2 |
| 2010/0133798 | A1* | 6/2010 | Fukawatase | B60R 21/2338 280/743.2 |
| 2010/0244419 | A1* | 9/2010 | Maripudi | B60R 21/233 280/743.2 |
| 2011/0309605 | A1* | 12/2011 | Kumagai | B60R 21/2338 280/741 |
| 2014/0175778 | A1* | 6/2014 | Choi | B60R 21/2338 280/743.2 |

(Continued)

FOREIGN PATENT DOCUMENTS

| EP | 1390239 A1 | 2/2004 |
|---|---|---|
| JP | 2010-116010 A | 5/2010 |
| JP | 2012-061882 A | 3/2012 |

(Continued)

*Primary Examiner* — James A English
(74) *Attorney, Agent, or Firm* — Mintz Levin Cohn Ferris Glovsky and Popeo, P.C.; Peter F. Corless (57) ABSTRACT

A passenger airbag apparatus for a vehicle is provided to more effectively protect the head of a passenger seated in a passenger seat, using an upper chamber of an airbag cushion including vent apertures, covers, and release cords in an oblique collision. Further the upper body (chest) of a passenger seated in a passenger seat is more effectively protected using a lower chamber of the airbag cushion.

11 Claims, 6 Drawing Sheets

(56) References Cited

U.S. PATENT DOCUMENTS

2015/0014969 A1* 1/2015 Choi .................... B60R 21/239
  280/730.1

FOREIGN PATENT DOCUMENTS

| KR | 10-2008-0007805 A | 1/2008 |
| KR | 2009-0117462 A | 11/2009 |
| KR | 2013-0013322 A | 2/2013 |
| KR | 2014-0076451 A | 6/2014 |

* cited by examiner

FIG. 6

PASSENGER AIR BAG APPARATUS FOR VEHICLE

CROSS REFERENCE TO RELATED APPLICATION

The present application claims priority to Korean Patent Application No. 10-2015-0155876, filed Nov. 6, 2015, the entire contents of which is incorporated herein for all purposes by this reference.

BACKGROUND

Field of the Invention

The present invention relates to a passenger airbag apparatus for a vehicle and, more particularly, to a passenger airbag apparatus for a vehicle that \effectively ensures passenger safety against an oblique collision.

Description of the Related Art

Currently, vehicle manufacturers manufacture and sell vehicles that satisfy a minimal overlap crash test. A minimal overlap crash test by the Insurance Institute for Highway Safety (MS) is performed with a vehicle speed of about 64 km/h, an angle of about 0 degrees, an offset of about 25%, and a rigid barrier. Such a test will be required later to satisfy a frontal research moving deformable barrier test, which is to be implemented in the future and which further considers passenger safety.

The new frontal research moving deformable barrier test is performed with a vehicle speed of about 90.1 km/h, an angle of about 15 degrees, an offset of about 35%, and Research Moving Deformable Barrier (RMDB), in which the vehicle speed and the bather are more severe in comparison to the minimal overlap crash test, so it is addressed to ensure passenger safety, especially, safety of the passenger in the passenger seat.

In other words, in an oblique collision, the upper body of the passenger in the passenger seat is moved toward the collision point (e.g., the driver's seat) with a substantial amount of movement (e.g., force) toward the front of the vehicle. Accordingly, to effectively protect the passenger in the passenger seat, an airbag cushion should sufficiently absorb shock to the passenger's head and sufficiently support the upper body (e.g., chest) of the passenger upon deployment. However, according to the related art in which an airbag cushion is disposed in a single compartment, it may be difficult to effectively protect both of the head and the upper body of the passenger in the passenger seat during an oblique collision.

When the pressure of an inflated airbag cushion is reduced to be appropriate to protect the passenger's head, a sufficient supporting force for protecting the upper body of the passenger may not be obtained, thus causing potential injury to the passenger's upper body. In contrast, when the pressure of an inflated airbag cushion is increased to be appropriate to protect the passenger's upper body, shock applied to the passenger's head may not be sufficiently absorbed, thus potentially causing a passenger's head to hit against the crush pad after hitting against the airbag cushion and thus possibly resulting in injury.

The foregoing is intended merely to aid in the understanding of the background of the present invention, and is not intended to mean that the present invention falls within the purview of the related art that is already known to those skilled in the art.

SUMMARY

Accordingly, the present invention provides a passenger airbag apparatus for a vehicle that may more effectively protect both of the head and the upper body (chest) of a passenger in a passenger seat In order to achieve the above object, according to one aspect of the present invention, a passenger airbag apparatus for a vehicle may include: an airbag cushion including a first vent and a second vent disposed opposite to each other when the airbag cushion is deployed (e.g., inflated) toward a passenger; a first cover and a second cover each having a first side connected to the airbag cushion and a second side covering the first vent and the second vent, respectively; and a first release cord and a second release cord that connect the first cover and the second cover, respectively, to the airbag cushion, and cross each other at a predetermined point between both ends.

The apparatus may further include: an inflator housing connected to the airbag cushion; and an inflator fixed to the inflator housing and operated by a controller to produce or generate airbag gas by exploding to inflate the airbag cushion. Additionally, the apparatus may include a diffuser disposed in the airbag cushion with a first end connected to the inflator housing and configured to transmit the airbag gas produced by explosion of the inflator into the airbag cushion. A separator having a first end connected to the diffuser and a second end connected to a front of the airbag cushion may separate an inside of the airbag cushion into an upper chamber and a lower chamber when the airbag cushion is inflated.

An outlet of the diffuser may be divided into a first outlet connected to the upper chamber and a second outlet connected to the lower chamber with respect to the separator. The first vent and the second vent may be formed at left and right sides of the upper chamber, respectively. The upper chamber may be a part configured to absorb a shock to protect the head of a passenger in a passenger seat, and the lower chamber may be a part configured to ensure a supporting force for protecting the upper body of the passenger. The lower chamber may be larger in volume than the upper chamber when the airbag cushion is inflated, to protect the upper body of a passenger in a passenger seat.

Further, the first ends of the first release cord and the second release cord may be connected to the first cover and the second cover, respectively, and second ends of the first and second release cords may be connected to predetermined left and right positions on the front of the airbag cushion, which forms the upper chamber, in an X-shape; and a cross point of the first release cord and the second release cord may be disposed at a center of the front of the airbag cushion, which forms the upper chamber, when the airbag cushion is inflated. When the head of a passenger in a passenger seat applies a force to the airbag cushion by hitting against a portion between a joint of the airbag cushion and the first release cord and a joint of the airbag cushion and the second release cord, the first and second covers may be moved or pushed away from the airbag cushion and the first vent and the second vent may both be opened.

When the head of a passenger in a passenger seat applies a force to the airbag cushion by hitting against a joint of the airbag cushion and the first release cord, the first cover connected to the first release cord may be moved away from the airbag cushion and the first vent may be opened, and the second cover at the opposite side may come in contact with the airbag cushion and the second vent may be maintained in a closed state. When the head of a passenger in a passenger seat applies a force to the airbag cushion by hitting against a joint of the airbag cushion and the second release cord, the second cover connected to the second release cord may be moved away from the airbag cushion and the second vent may be opened, and the first cover at the opposite side may come in contact with the airbag cushion and the first vent may be maintained in a closed state.

A concave portion that protrudes inside the airbag cushion may be formed at the center of the front of the airbag cushion that forms the upper chamber when the airbag cushion is inflated, convex portions that protrude outward from the airbag cushion may be formed at left and right sides of the concave portion, a vertex of the concave portion may be aligned with the cross point of the first release cord and the second release cord, and the first release cord and the second release cord may be connected to vertexes of the convex portions.

According to the present invention, it may be possible to more effectively protect the head of a passenger in a passenger seat with the upper chamber of the airbag cushion in an oblique collision and to more effectively protect the upper body (chest) of the passenger with the lower chamber of the airbag cushion, thereby improving the commercial value of the product.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, an exemplary embodiment of a passenger airbag apparatus for a vehicle according to the present invention will be described in detail with reference to the accompanying drawings A passenger airbag apparatus according to an exemplary embodiment of the present invention, as shown in FIGS. 1 to 6, may include: an airbag cushion 10 having a first vent 11 and a second vent 12 disposed opposite to each other when the airbag cushion 10 is inflated toward a passenger; a first cover 20 and a second cover 30 each having a first side connected to the airbag cushion 10 and a second side covering the first vent 11 and the second vent 12, respectively; and a first release cord 40 and a second release cord 50 that connect the first cover 20 and the second cover 30, respectively, to the airbag cushion 10, and cross each other at a predetermined point between both ends.

The passenger airbag apparatus may further include: an inflator housing 60 connected to the airbag cushion 10; an inflator 80 fixed to the inflator housing 60 and operated by a controller 70 to produce airbag gas by exploding to inflate the airbag cushion 10; a diffuser 90 disposed in the airbag cushion 10 with a first end connected to the inflator housing 60 and configured to transmit (e.g., guide) the airbag gas produced by explosion of the inflator 80 into the airbag cushion 10; and a separator 100 having a first end connected to the diffuser 90 and a second end connected to the front 13 of the airbag cushion 10 and that separates the inside of the airbag cushion 10 into an upper chamber 14 and a lower chamber 15 when the airbag cushion 10 is inflated.

Figure 1:
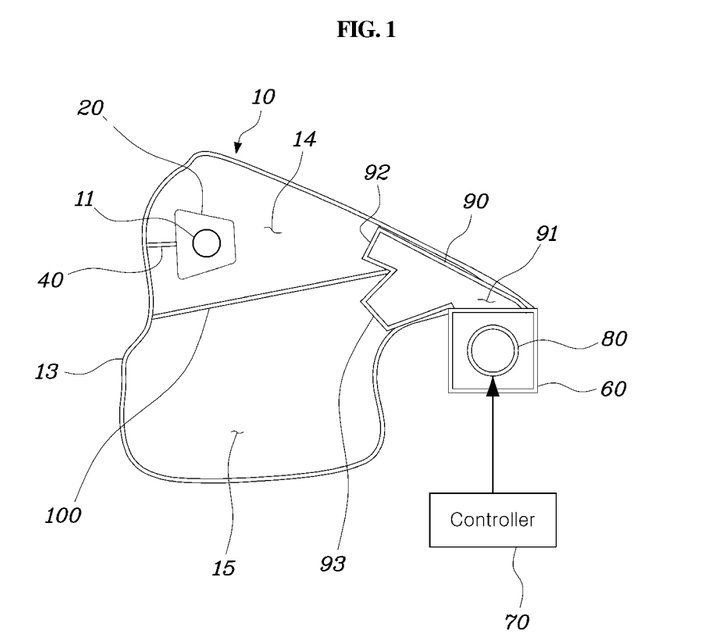
FIG. 1 is a cross-sectional view illustrating a passenger airbag apparatus for a vehicle according to an exemplary embodiment of the present invention.

The controller 70 may be configured to operate the inflator 80 of the passenger seat airbag apparatus in response to signals received from various sensors within a vehicle and the sensors may include a collision sensor, a speed sensor, a rollover sensor, and an imaging device (e.g. a camera, a video camera, etc.). The airbag gases in the upper chamber 14 and the lower chamber 15 may be completely separated to prevent movement of the gases between the chambers by the separator 100.

Alternatively, the gases may be allowed to move between the chambers through a plurality of apertures in the separator 100. Additionally, an inlet 91 of the diffuser 90 may be hermetically connected to the inflator housing 60 and an outlet of the diffuser 90 may be divided into a first outlet 92 connected to the upper chamber 14 and a second outlet 93 connected to the lower chamber 15 with respect to the separator 100. The first vent 11 and the second vent 12 may be formed facing each at the left and right sides of the upper chamber 14.

The upper chamber 14 may protect the head of a passenger disposed (e.g., seated) in a passenger seat. However, when the internal pressure of the upper chamber 14 is excessive, the head of the passenger may be injured to due to the applied shock. Accordingly, to prevent the applied shock from causing injury, the first and second vents 11 and 12 may be formed at the upper chamber 14 to discharge the airbag gas through the first and second vents 11 and 12 and the internal pressure of the upper chamber 14 decreases accordingly, when the head of the passenger hits against the upper chamber 14; therefore, the head of a passenger in a passenger seat may be protected more effectively.

The lower chamber 15 may obtain a supporting force for protecting the upper body (chest) of the passenger in a passenger seat. However, the upper body of a passenger applies a substantial amount of force to the lower chamber during a collision, thus requiring a supporting force to maintain sufficient internal pressure to effectively protect the upper body of the passenger; therefore there is no vent at the lower chamber 15. The lower chamber 15 may be larger in volume than the upper chamber 14 when the airbag cushion 10 is inflated to more effectively protect the upper body of a passenger in a passenger seat.

Figure 2:
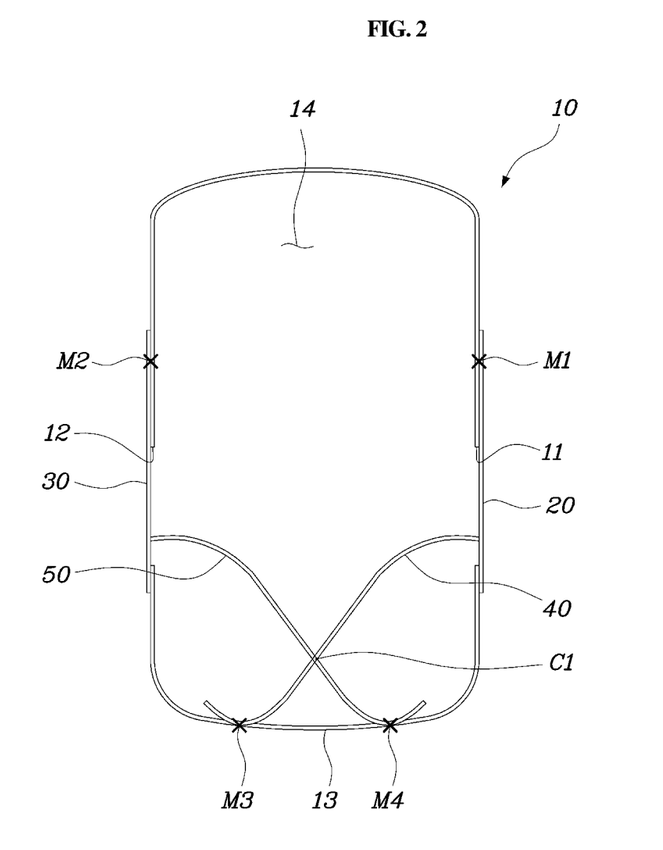
FIG. 2 is a plan view of FIG. 1 according to an exemplary embodiment of the present invention.

Further, the first release cord 40 and the second release cord 50 may be type of tethers made of flexible fabric or wires. First ends of the first release cord 40 and the second release cord 50 may be connected to the first cover 20 and the second cover 30, respectively, and second ends may be connected to predetermined left and right positions on the front 13 of the airbag cushion 10, which forms the upper chamber 14, in an X-shape. The cross point C1 of the first release cord 40 and the second release cord 50 may be at the center of the front 13 of the airbag cushion 10, which forms the upper chamber 14, when the airbag cushion 10 is inflated to simultaneously operate the first release cord 40 and the second release cord 50 and the first vent 11 and the second vent 12 may be opened simultaneously, when the head of a passenger in a passenger seat hits against the center of the front 13 of the airbag cushion 10 that forms the upper chamber 14 to more stably operate the first cover 20 and the second cover 30.

In FIG. 2, the reference numeral 'M1' indicates the joint of the first end of the first cover 20 and the airbag cushion 10; the reference numeral 'M2' indicates the joint of the first end of the second cover 30 and the airbag cushion 10; the reference numeral 'M3' indicates the joint of the first release cord 40 and the airbag cushion 10; and the reference numeral 'M4' indicates the joint of the second release cord 50 and the airbag cushion 10, in which the joints M1, M2, M3, and M4 are formed by sewing.

Figure 3:
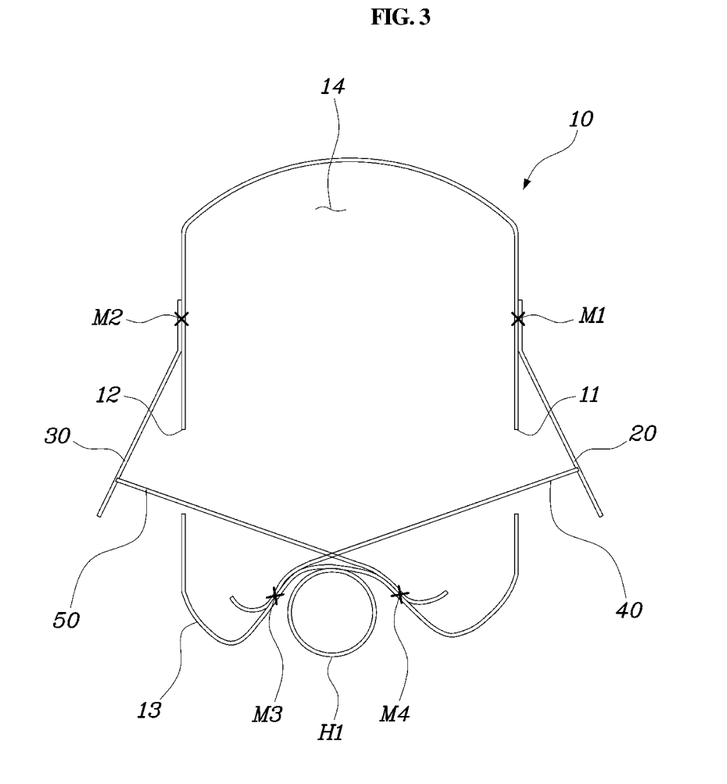
FIG. 3 is a view illustrating both a first vent and a second vent open according to an exemplary embodiment of the present invention.

According to the present invention, as shown in FIG. 3, when the airbag cushion 10 is inflated and the head H1 of a passenger in a passenger seat applies a force to the airbag cushion 10 by hitting against the portion between the joint M3 of the airbag cushion 10 and the first release cord 40 and the joint M4 of the airbag cushion 10 and the second release cord 50 of the front 13 of the airbag cushion 10 forming the upper chamber 14, that is, when the head of the passenger in a passenger seat makes a frontal collision, the joints M3 and M4 move into the airbag cushion 10, the first release cord 40 and the second release cord 50 may be loosened, the first and second covers 20 and 30 may be moved or pushed away from the airbag cushion 10, the first and second vents 11 and 12 may both be opened, the airbag gas in the upper chamber 14 may be discharged to the exterior, and the internal pressure of the upper chamber 14 may decrease. Accordingly, a shock may be absorbed more sufficiently and the head of the passenger in the passenger seat may be maximally effectively protected.

Figure 4:
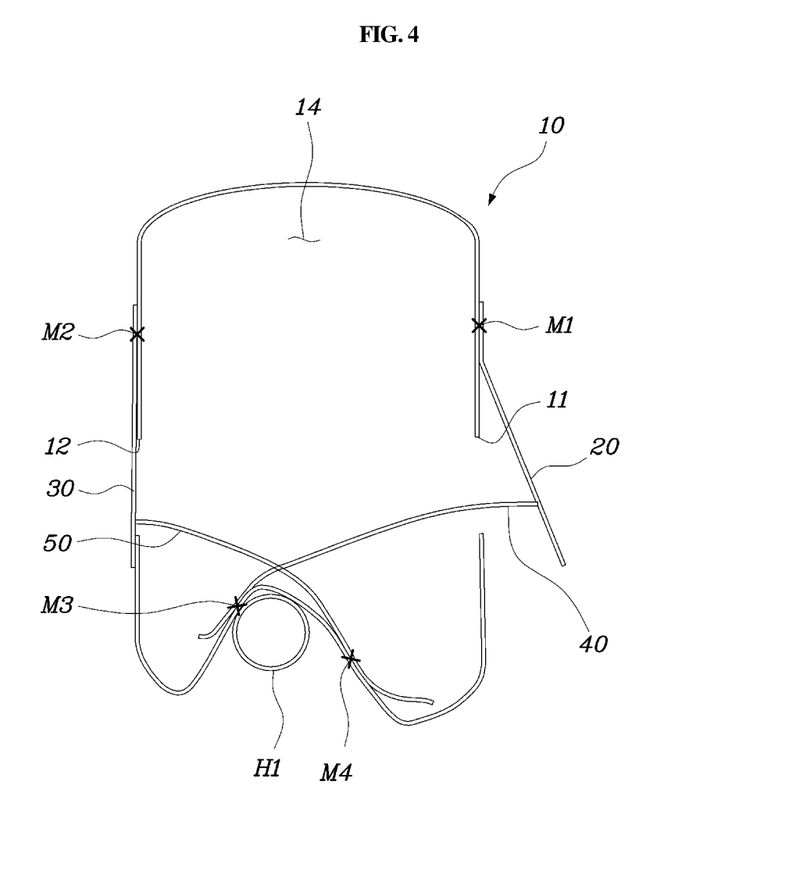
FIG. 4 is view illustrating a first vent open according to an exemplary embodiment of the present invention.

Further, in a collision, as shown in FIG. 4, when the airbag cushion 10 is inflated and the head H1 of the passenger in a passenger seat applies a force to the airbag cushion 10 by hitting against the joint M3 of the airbag cushion 10 and the first release cord 40, that is, when the head of the passenger in a passenger seat obliquely hits against the airbag cushion 10, the joint M3 moves into the airbag cushion 10, the joint M4 of the airbag cushion 10 and the second release cord 50 may move outward from the airbag cushion 10, the first release cord 40 may be loosened, the second release cord 50 may be pulled, the first cover 20 may be moved or pushed away from the airbag cushion 10 by the loosening of the first release cord 40 and the first vent aperture 11 may be opened accordingly, and the second cover 30 may come in contact with (e.g., may abut) the airbag cushion 10 by the pulling of the second release cord 50 and the second vent 12 may be maintained in a closed state. Accordingly, the airbag gas in the upper chamber 14 may be discharged through the first vent 11, to maintain the internal pressure for cushioning of the upper chamber 14 for a substantial long period of time. Therefore, it may be possible to maximally effectively protect the head of a passenger in a passenger seat in an oblique collision.

Figure 5:
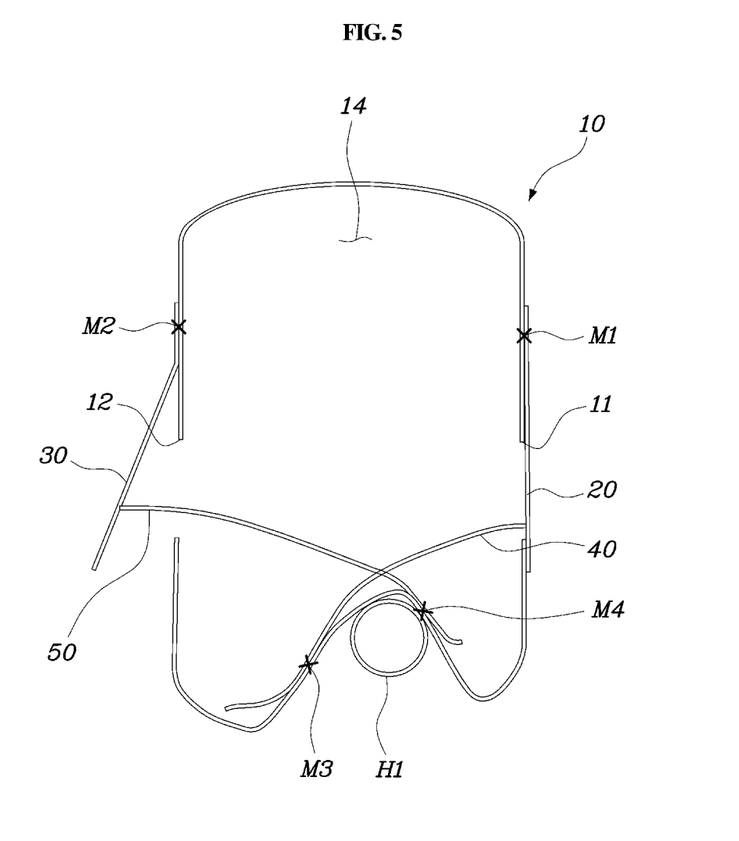
FIG. 5 is view illustrating a second vent open according to an exemplary embodiment of the present invention.

Further, in a collision, as shown in FIG. 5, when the airbag cushion 10 may be inflated and the head H1 of the passenger in a passenger seat applies a force to the airbag cushion 10 by hitting against the joint M4 of the airbag cushion 10 and the second release cord 50, that is, when the head of the passenger in a passenger seat hits against the airbag cushion 10 obliquely to the right side, the joint M4 moves into the airbag cushion 10, the joint M3 of the airbag cushion 10 and the first release cord 40 may move outward from the airbag cushion 10, the second release cord 50 may be loosened, the first release cord 40 may be pulled, the second cover 30 may be moved or pushed away from the airbag cushion 10 by the loosening of the second release cord 50 and the second vent aperture 12 may be opened accordingly, and the first cover 20 may come in contact with (e.g., approach, abut, etc.) the airbag cushion 10 by the pulling of the first release cord 40 and the first vent 12 may be maintained in a closed state. Accordingly, the airbag gas in the upper chamber 14 may be discharged through the second vent 12, to maintain the internal pressure for cushioning of the upper chamber 14 for a substantial long period of time. Therefore, it may be possible to maximally effectively protect the head of a passenger in a passenger seat in an oblique collision.

Figure 6:
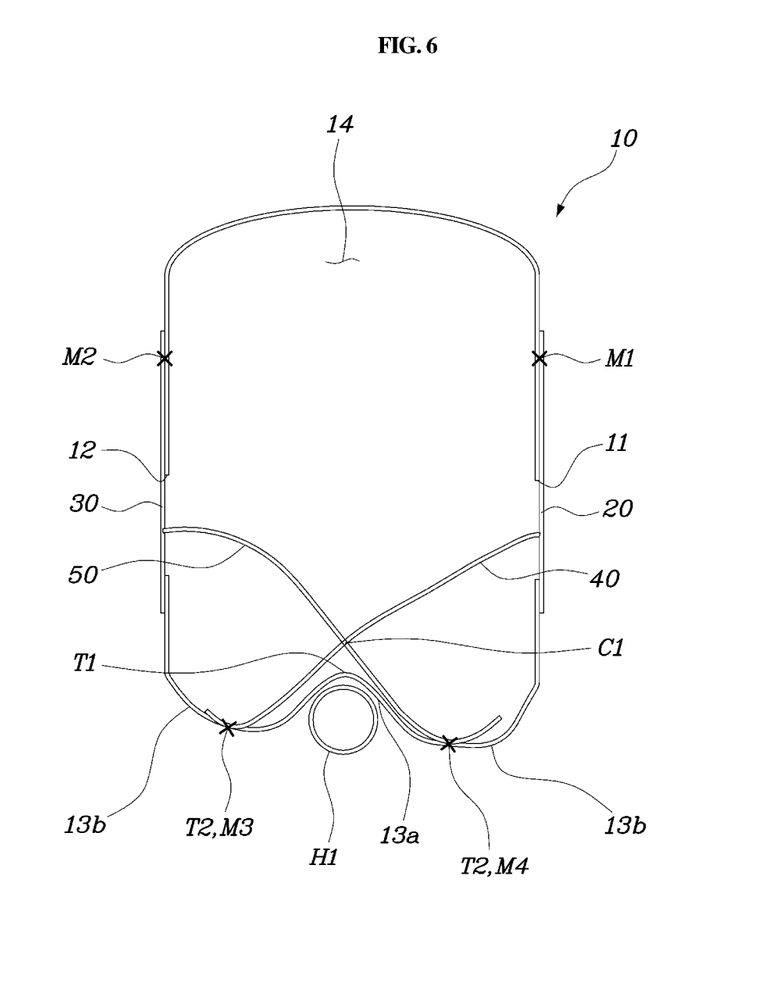
FIG. 6 is a view illustrating another embodiment in which the front of an airbag cushion forming an upper chamber is composed of a concave portion and a convex portion according to an exemplary embodiment of the present invention.

Furthermore, according to an exemplary embodiment of the present invention, as shown in FIG. 6, a concave portion 13a that protrudes inside the airbag cushion 10 may be formed at the center of the front 13 of the airbag cushion 10 that forms the upper chamber when the airbag cushion 10 is inflated and convex portions 13b that protrude outward from the airbag cushion 10 may be formed at the left and right sides of the concave portion 13a. The vertex T1 of the concave portion 13a may be aligned with the cross point C1 of the first release cord 40 and the second release cord 50, and the first release cord 40 and the second release cord 50 may be connected to the vertexes T2 of the convex portions 13b.

By forming the concave portion 13a at the center of the front 13 of the airbag cushion 10 that forms the upper chamber 14, the head H1 of a passenger in a passenger seat may be guided during a collision to hit against the center, that is, the concave portion 13a, so it may be possible to prevent the passenger's head from obliquely hitting against the airbag cushion 10 and accordingly it may be possible to maximally protect the head of the passenger.

Further, by forming the convex portions 13b at both sides of the concave portion 13a and connecting the first release cord 40 and the second release cord 50 to the vertexes T2 of the convex portions 13b, when the head of a passenger in a passenger seat hits against the concave portion 13a during a collision, the first cover 20 and the second cover 30 may be operated more stably by the first release cord 40 and the second release cord 50 that are simultaneously operated, the first vent 11 and the second vent 12 may be opened simultaneously, and the airbag gas in the cupper chamber 14 may be discharged to the exterior, to sufficiently absorb shock while the internal pressure of the upper chamber 14 decreases. Accordingly, it may be possible to maximally protect the head of the passenger.

As described above, according to an exemplary embodiment of the present invention, it may be possible to more effectively protect the head of a passenger in a passenger seat with the upper chamber 14 of the airbag cushion 10 in an oblique collision and to more effectively protect the upper body (chest) of the passenger with the lower chamber 15 of the airbag cushion 10, thereby improving the commercial value of the product.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A passenger airbag apparatus for a vehicle, comprising:
an airbag cushion having a first vent and a second vent disposed opposite to each other when the airbag cushion is inflated toward a passenger;
a first cover and a second cover each having a first side connected to the airbag cushion and a second side covering the first vent and the second vent, respectively;
a first release cord and a second release cord that connect the first cover and the second cover, respectively, to the airbag cushion, and cross each other at a predetermined point between both ends:
a separator separating an inside of the airbag cushion into an upper chamber and a lower chamber when the airbag cushion is inflated,
wherein first ends of the first release cord and the second release cord are connected to the first cover and the second cover, respectively, and second ends of the first and second release cords are connected to the predetermined left and right positions on the front of the airbag cushion, which forms the upper chamber, in an X-shape, and a cross point of the first release cord and the second release cord is at a center of the front of the airbag cushion, which forms the upper chamber, when the airbag cushion is deflated;
a concave portion that protrudes inside the airbag cushion is formed at the center of the front of the airbag cushion that forms the upper chamber when the airbag cushion is inflated; and
convex portions that protrude outward from the airbag cushion are formed at left and right sides of the concave portion,
wherein a vertex of the concave portion is aligned with the cross point of the first release cord and the second release cord, and the first release cord and the second release cord are connected to vertexes of the convex portions.

2. The apparatus of claim 1, further comprising:
an inflator housing connected to the airbag cushion; and
an inflator fixed to the inflator housing and operate by a controller to produce airbag gas by exploding to inflate the airbag cushion.

3. The apparatus of claim 2, further comprising:
a diffuser disposed in the airbag cushion with a first end connected to the inflator housing and configured to guide the airbag gas produced by explosion of the inflator into the airbag cushion.

4. The apparatus of claim 1, wherein the separator has:
a first end connected to the diffuser and a second end connected to a front of the airbag cushion.

5. The apparatus of claim 4, wherein an outlet of the diffuser is divided into a first outlet connected to the upper chamber and a second outlet connected to the lower chamber with respect to the separator.

6. The apparatus of claim 4, wherein the first vent and the second vent are formed at left and right sides of the upper chamber, respectively.

7. The apparatus of claim 4, wherein the upper chamber is configured to absorb a shock to protect the head of a passenger seated in a passenger seat, and the lower chamber ensures a supporting force for protecting the upper body of the passenger.

8. The apparatus of claim 4, wherein the lower chamber is larger in volume than the upper chamber when the airbag cushion is inflated, to protect the upper body of a passenger seated in a passenger seat.

9. The apparatus of claim 1, wherein the first and second covers are moved away from the airbag cushion and the first vent and the second vent are both opened when the head of a passenger seated in a passenger seat applies a force to the airbag cushion by hitting against a portion between a joint of the airbag cushion and the first release cord and a joint of the airbag cushion and the second release cord.

10. The apparatus of claim 1, wherein the first cover connected to the first release cord is moved away from the airbag cushion and the first vent is opened, and the second cover at the opposite side comes in contact with the airbag cushion and the second vent is maintained in a closed state when the head of a passenger seated in a passenger seat applies a force to the airbag cushion by hitting against a joint of the airbag cushion and the first release cord.

11. The apparatus of claim 1, wherein the second cover connected to the second release cord is moved away from the airbag cushion and the second vent is opened, and the first cover at the opposite side comes in close contact with the airbag cushion and the first vent is maintained in a closed state when the head of a passenger seated in a passenger seat applies a force to the airbag cushion by hitting against a joint of the airbag cushion and the second release cord.

* * * * *